United States Patent [19]
Hauris et al.

[11] Patent Number: 5,970,095
[45] Date of Patent: Oct. 19, 1999

[54] SECURE DATA TRANSMISSION ON A TDM ISOCHRONOUS NETWORK

[75] Inventors: Jon F. Hauris, Manassas; Ronald A. Bowen, Sterling, both of Va.

[73] Assignee: Lockheed Martin Corporation, Bethesda, Md.

[21] Appl. No.: 08/837,165

[22] Filed: Apr. 14, 1997

[51] Int. Cl.⁶ .................................................. H04L 27/00
[52] U.S. Cl. .......................... 375/259; 370/321; 370/437; 380/37
[58] Field of Search ...................................... 375/200, 208, 375/259; 370/310, 321, 329, 337, 341, 347, 442, 431; 380/37, 42, 46

[56] References Cited

U.S. PATENT DOCUMENTS

| | | | |
|---|---|---|---|
| 3,809,817 | 5/1974 | Gill et al. | 370/206 |
| 3,950,616 | 4/1976 | Tammaru | 375/365 |
| 4,004,089 | 1/1977 | Richard et al. | 380/46 |
| 4,070,693 | 1/1978 | Shutterly | 380/14 |
| 4,850,019 | 7/1989 | Shimizu et al. | 380/29 |
| 4,866,773 | 9/1989 | Lubarsky | 340/825.44 |
| 5,091,840 | 2/1992 | Clebowicz | 363/96 |
| 5,121,389 | 6/1992 | Faulkner | 370/452 |
| 5,455,822 | 10/1995 | Dixon et al. | 370/18 |
| 5,488,631 | 1/1996 | Gold et al. | 375/206 |
| 5,787,076 | 7/1998 | Anderson et al. | 370/294 |

*Primary Examiner*—Chi H. Pham
*Assistant Examiner*—Bryan Webster
*Attorney, Agent, or Firm*—Lane, Aitken and McCann

[57] ABSTRACT

A secure method for transmitting data on an isochronous network in which data is spread in successive frames in a manner known to the sender and receiver but unknown to other nodes on the network. In one embodiment, some or all bits which comprise a byte are transmitted in different channels (i.e. time slots) so that the bits which comprise a byte are spread over several channels in a pattern known to the sender and receiver but not to unauthorized parties on the network. This bit spreading can be performed in real time and without latency or performance problems. In another embodiment, the channel or channels assigned for communication between two nodes on the network change in a sequence known to the sending and receiving nodes but not known to unauthorized parties.

2 Claims, 2 Drawing Sheets

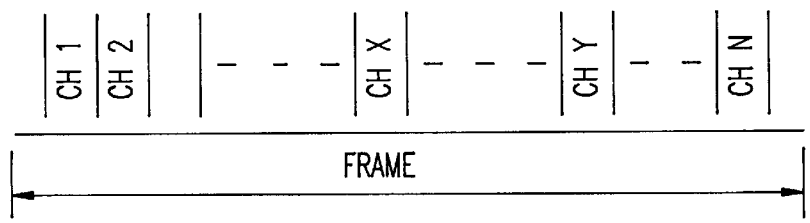
FIG.1A
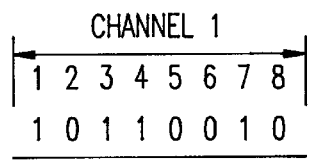 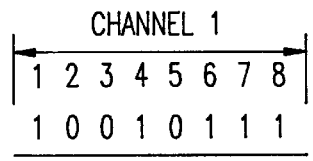
FIG.1B  FIG.1C
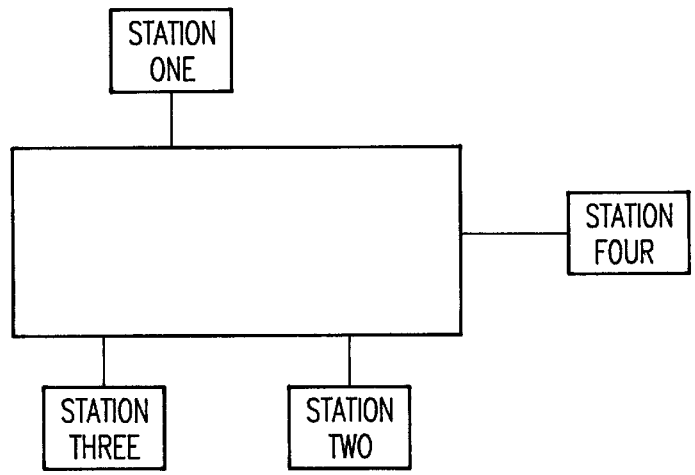
FIG.2 ial to the invention. However, a one byte wide time slot
SECURE DATA TRANSMISSION ON A TDM ISOCHRONOUS NETWORK

BACKGROUND OF THE INVENTION

1. Field of the Invention

This invention relates to a secure method for transmitting data over an isochronous network, and more particularly to a secure method which is compatible with existing network protocols, hardware and software.

2. Description of the Prior Art

As will be appreciated by those skilled in the art, in any time division multiplexed (TDM) isochronous network, synchronous data is arranged and grouped into repeating units. These units are referred to as a cycle or frame. Each frame is divided into a fixed number of individual time slots. For example, FDDI-II has 1536 time slots per frame; a frame is generated every 125 used by a master station. Each frame has a header, and up to 96 bytes of circuit-switched data. One isochronous frame every 125 used consumes 6.144 Mbps of bandwidth for the 96 circuit switched channels with a maximum of 16 isochronous frames every 125 used allows up to the 1536 channels and uses 98.3 Mbps of band width.

FDDI-II is a high-performance, fiber optic, token ring LAN running at 100 MBS. FDDI-II is a successor to FDDI with a modification to handle synchronous circuit-switched pulse code modulated (PCM) data for voice or ISDN traffic, in addition to ordinary data. In addition to regular (asynchronous) frames for ordinary data, special frames are permitted for isochronous circuit switched data. These frames are generated every 125 microseconds by a master station. The FDDI-II cycle structure is defined in Section 5 of the ANSI FDDI Hybrid Ring Control standard (X3T9/89-43 Rev 6.3) and incorporated herein by reference. Each new cycle or frame consists of control and data bytes or octets. The master station adjusts the latency of the FDDI-II ring so that there are always an integral number of these frames or cycles on the ring. Each frame is partitioned into four parts: a preamble, a cycle header, a dedicated packet group, and sixteen, wideband channels (WBCs). Each wideband channel can be dynamically allocated to either isochronous or packet data use. For isochronous use, each wideband channel provides 6.144 Mbps of bandwidth, and consists of 96 octets interleaved across the cycle. Once a station has acquired one or more time slots in a frame, those slots are reserved for it until they are explicitly released. The allocation of bandwidth to isochronous users is defined in Section 9.3 of the ANSI FDDI Station Management-2 Isochronous Services (SMT-2-IS) standard (X3T9/93-122 Rev 3.0).

The FDDI-II ring is a collection of ring interfaces connected by point-to-point lines. Each bit arriving at an interface is copied into a buffer and then copied out onto the ring again. Isochronous WBCs can be subdivided into individual transmission channels. A transmission channel consists of a contiguous sequence of octets within a WBC. Each data octet of a transmission channel provides 64 kbps of isochronous bandwidth. A logical channel is a unit of allocation that may consist of one or more transmission channels. WBCs are subdivided into separate logical channels to permit simultaneous, independent isochronous dialogues.

An FDDI-II management agent, such as a call controller, receives an allocation of isochronous bandwidth before completing a connection between two or more isochronous users. It is the responsibility of a Channel Allocator (CA) to create logical channels and assign isochronous bandwidth to those channels for use by call control.

The TDM isochronous network allocates individual channels within the master cycle/frame, on a time slot basis. That is, channel i is assigned time slot(s) x, channel j is assigned time slot(s) y, etc. Usually the time slots hold the equivalent of a single byte. This is not always the case and is not material to the invention. However, a one byte wide time slot will be discussed as an exemplar and because it is the most common allocation.

Thus, the transmitter and receiver are told that they are to communicate by using a particular constant channel. For example, say that they were assigned channel 16, and that channel 16 corresponds to time slot 16. This is the same as byte number 16 in the master cycle. This means that the transmitter and receiver would start counting time slots (or bytes) at the start of each master cycle, and when they counted to time slot 16, the transmitter would put his data into that time slot/byte and that the receiver would pull the data out of that time slot. This would repeat every 125 microseconds and the communication channel would be established.

The problem is that someone on the network who wants to eaves drop or clandestinely listen to, or input false data, could easily lock onto this channel. That is, the channel is not secure.

SUMMARY OF THE INVENTION

An object of this invention is to provide a secure method of data transmission on an isochronous network; a method that is compatible with existing network protocols, network hardware, and network software.

Briefly, this invention contemplates the provision of a secure method for transmitting data on an isochronous network in which data is spread in successive frames in a manner known to the sender and receiver but unknown to other nodes on the network. In one embodiment, some or all bits which comprise a byte are transmitted in different channels (i.e. time slots) so that the bits which comprise a byte are spread over several channels in a pattern known to the sender and receiver but not to unauthorized parties on the network. This bit spreading can be performed in real time and without latency or performance problems. In another embodiment, the channel or channels assigned for communication between two nodes on the network change in a sequence known to the sending and receiving nodes but not known to unauthorized parties.

BRIEF DESCRIPTION OF THE DRAWINGS

The foregoing and other objects, aspects and advantages will be better understood from the following detailed description of a preferred embodiment of the invention with reference to the drawings, in which:

FIGS. 1A, 1B, and 1C are graphic representations for comparing channel assignment in a conventional isochronous network and in an isochronous network in accordance with the teachings of this invention.

FIG. 2 is a block diagram of nodes on an isochronous network interfaced to the network for secure transmission in accordance with the teachings of this invention.

DETAILED DESCRIPTION OF A PREFERRED EMBODIMENT OF THE INVENTION

Figure 3:
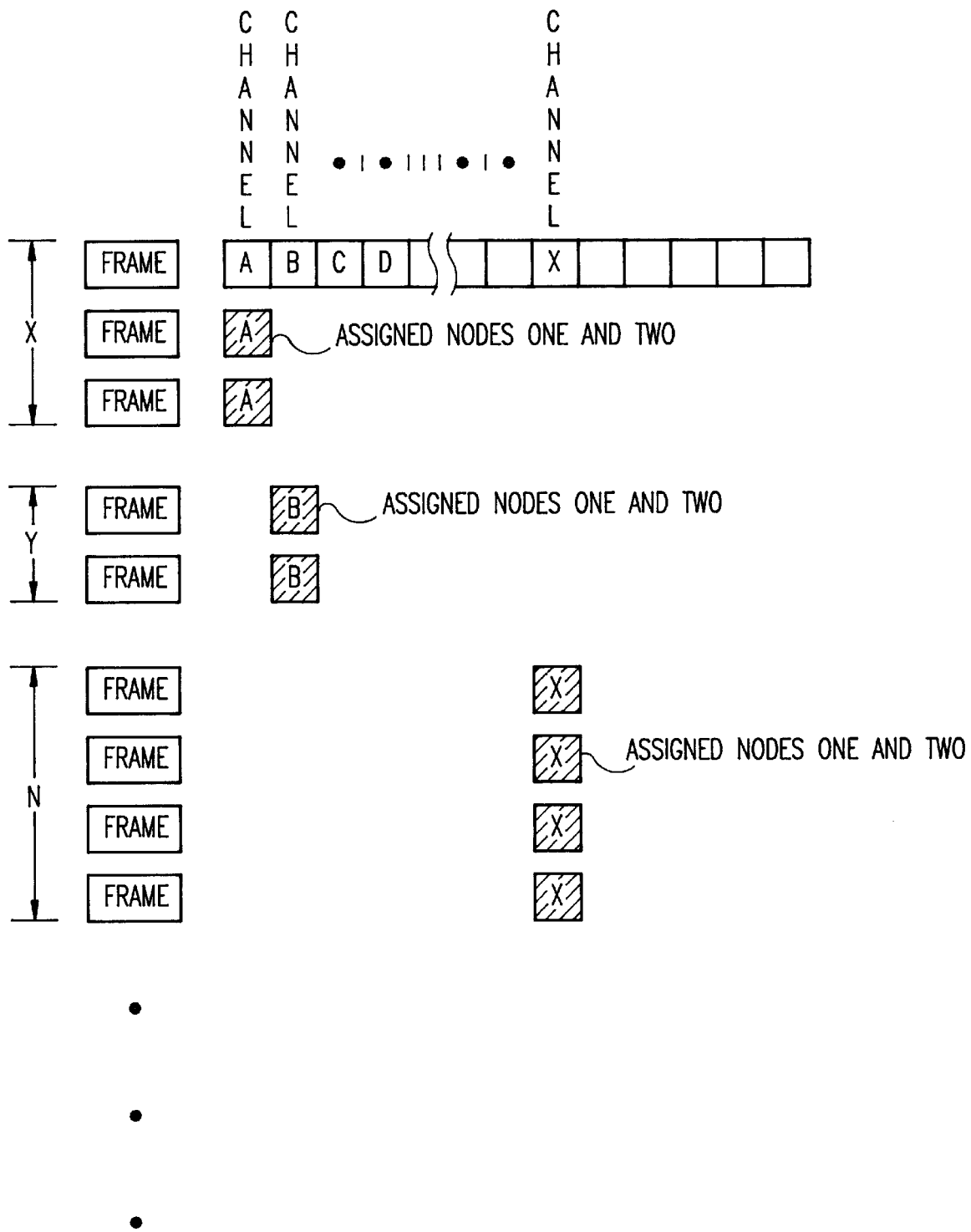
FIG. 3 is a graphic representation of a channel jumping embodiment of the invention.

Referring now to FIG. 1A, as will be appreciated by those skilled in the art, an isochronous frame, indicated by the general reference number 10, is divided into a number time slots of equal duration called channels. One or more of these channels in an isochronous frame is assigned for communication between two stations on the network in accordance with standard network protocols. Once a station has acquired one or more time slots those time slots are reserved until explicitly released. FIG. 1B illustrates a typical, prior art, non-secure ordering of data transmitted in three channels (channel 1, channel x and channel y) assigned for communication between stations One and Two of FIG. 2. Here, data is transmitted in accordance with a protocol used by all the stations on the network. For example, as illustrated in FIG. 1B, successive eight bit data bytes are transmitted in succession in the three assigned channels. That is, byte one is transmitted in bit positions 0–7 of channel 1, byte two in bit positions 0–7 of channel x, byte three in channel y, byte four in channel 1 of the next frame, and so on. In accordance with the teachings of this invention, the bits which comprise each byte are transmitted in a pattern known only to the sending and receiving stations. For example, as illustrated in FIG. 1C, in transmitting the bytes as shown in FIG. 1B, the first bit of bytes one, two, and three are transmitted in channel one in bit positions 1, 2, and 3; the second bit of these three bytes are transmitted in bit positions 1, 2, and 3 of channel x; the third bit of each byte in bit positions 1, 2, and 3 in channel y; the fourth bit of each byte in bit positions 4, 5, and 6 of channel one; the fifth bits in bit positions 4, 5, and 6 of channel x; the sixth bits in 4, 5, and 6 of channel y; two of seventh bits in bit positions 7 and 8 of channel 1 and the remaining seventh bit in bit position 7 of channel x; one of the eighth bits is transmitted in bit position 8 of channel x, the remaining two bits are transmitted in positions 7 and 8 of channel y. The pattern could be repeated for successive frames, or a different pattern could be used so long as the sender and receiver know what the pattern is for each frame or set of frames. The sender and receiver agree in advance on a pattern by means of a secure communication between sender and receiver, such as an encrypted message sent over the network, or a secure off network channel such as a telephone connection.

FIG. 3 is an embodiment of the invention where the channel assignment for communication between two nodes is altered in successive frames. The assigned communications channel jumps from one channel to another channel to yet another channel for sequential frames with the transmitter and receiver jumping in unison to the newly assigned channel. A single channel can consist of multiple time slots, with the time slots contiguous or non-contiguous. In the example illustrated in FIG. 3, node One as transmitter and node Two as receiver have been assigned initially channel A. After communicating on channel A for a predetermined number of cycles or frames (e.g. x frames) these two nodes switch to a different preassigned channel, here channel B. These two nodes then communicate on channel B for a preassigned number of cycles or frames (e.g. y frames). After y frames, the two nodes then jump to another preassigned channel, in this example channel X, although the nodes could jump back to previously assigned channel A and would typically jump back at some point in time to previously assigned channels. This would continue for the duration of the transmission in a real time mode with the assignment of new channels and the duration of time spent in an assigned channel being in accordance with a preassigned pattern, known to the sending and receiving nodes but unknown to other nodes on the network. Alternatively, the assignment of new channels and duration of time in an assigned channel can made in real time.

While the invention has been described in terms of a single preferred embodiment, those skilled in the art will recognize that the invention can be practiced with modification within the spirit and scope of the appended claims.

Having thus described our invention, what we claim as new and desire to secure by letters patent is as follows:

1. A method for secure communication between a sender and a receiver on a network using a time division multiplex isochronous protocol in which the network allocates individual channels on a time slot basis within each isochronous frame of data transmitted on said network including the steps of:

assigning a plurality of said channels in each said isochronous frame for communication between said sender and said receiver;

transmitting some but not all bits of a first data byte in one of said plurality of channels in each said isochronous frame assigned in said assigning step, and some but not all bits of a second data byte in another of said plurality channels in each said frame assigned in said assigning step in a pattern of channel allocation known to the sender and receiver.

2. A method for secure communication between a sender and a receiver on a network using a time division multiplex isochronous protocol in which the network allocates individual channels on a time slot basis within each isochronous frame of data transmitted on said network including the steps of:

assigning one or more channels in a first isochronous frame for communication of a continuous stream of data between said sender and said receiver;

transmitting a first plurality of bits of said continuous data stream in said one or more channels assigned in the just previous assigning step;

assigning one or more channels in a second isochronous frame that are different than the channels assigned in the previous assigning step for communication of said continuous stream of data;

transmitting a second plurality of bits of said continuous data stream in said one or more channels assigned in the just previous assigning step so that the channel assignment periodically jumps in a pattern known to said sender and said receiver.

* * * * *